(12) United States Patent
Wagner

(10) Patent No.: US 8,884,460 B2
(45) Date of Patent: Nov. 11, 2014

(54) EMERGENCY ENERGY SUPPLY DEVICE FOR A HYBRID VEHICLE

(75) Inventor: Arndt Wagner, Eberdingen (DE)

(73) Assignee: Robert Bosch GmbH, Stuutgart (DE)

( * ) Notice: Subject to any disclaimer, the term of this patent is extended or adjusted under 35 U.S.C. 154(b) by 1064 days.

(21) Appl. No.: 12/937,946

(22) PCT Filed: Feb. 11, 2009

(86) PCT No.: PCT/EP2009/051528
§ 371 (c)(1),
(2), (4) Date: Jan. 10, 2011

(87) PCT Pub. No.: WO2009/127451
PCT Pub. Date: Oct. 22, 2009

(65) Prior Publication Data
US 2011/0101774 A1    May 5, 2011

(30) Foreign Application Priority Data

Apr. 14, 2008  (DE) .......................... 10 2008 001 145

(51) Int. Cl.
| | |
|---|---|
| *B60L 1/00* | (2006.01) |
| *B60L 3/00* | (2006.01) |
| *H02G 3/00* | (2006.01) |
| *H02J 7/14* | (2006.01) |
| *B60L 11/18* | (2006.01) |
| *H02J 7/34* | (2006.01) |
| *H02J 9/06* | (2006.01) |

(52) U.S. Cl.
CPC .................. *H02J 9/06* (2013.01); *H02J 7/1423* (2013.01); *Y02T 10/7005* (2013.01); *B60L 11/1868* (2013.01); *H02J 7/345* (2013.01); *Y02T 10/7022* (2013.01); *Y02T 10/7066* (2013.01); *B60L 3/0046* (2013.01)

USPC ........................................... 307/10.1; 307/9.1

(58) Field of Classification Search
CPC ........... H02J 7/1423; H02J 7/345; H02J 9/06; B60L 11/1868; B60L 3/0046; Y02T 10/7066; Y02T 10/7022; Y02T 10/7005
USPC .................................................. 307/9.1, 10.1
See application file for complete search history.

(56) References Cited

U.S. PATENT DOCUMENTS

| | | | |
|---|---|---|---|
| 5,796,175 A * | 8/1998 | Itoh et al. ..................... | 307/10.1 |
| 5,959,369 A | 9/1999 | Descombes et al. | |
| 2002/0109406 A1* | 8/2002 | Aberle et al. ................ | 307/10.1 |
| 2003/0127912 A1 | 7/2003 | Mackel et al. | |
| 2006/0145536 A1* | 7/2006 | Hackl et al. .................. | 307/10.1 |
| 2008/0011528 A1* | 1/2008 | Verbrugge et al. ........... | 180/65.2 |

FOREIGN PATENT DOCUMENTS

| | | |
|---|---|---|
| DE | 101 60 266 | 6/2003 |
| EP | 1 093 974 | 4/2001 |

(Continued)

OTHER PUBLICATIONS

International Search Report for PCT/EP2009/051528, dated Oct. 22, 2009.

*Primary Examiner* — Jared Fureman
*Assistant Examiner* — Toan Vu
(74) *Attorney, Agent, or Firm* — Kenyon & Kenyon LLP

(57) ABSTRACT

An emergency energy supply device for providing an emergency energy supply for a hybrid vehicle includes a high-voltage battery for driving an electric drive and a low-voltage battery. The emergency energy supply device includes an energy store, which is electrically connectible to the high-voltage battery and/or to the low-voltage battery and is arranged to provide the emergency energy supply.

12 Claims, 2 Drawing Sheets

(56) References Cited

FOREIGN PATENT DOCUMENTS

| GB | 2 132 803 | 7/1984 |
| JP | 9046921 | 2/1997 |
| JP | 10196772 | 7/1998 |
| JP | 2003070103 | 3/2003 |
| JP | 2006174619 | 6/2006 |
| WO | WO 2004/034543 | 4/2004 |
| WO | WO 2004/070911 | 8/2004 |

* cited by examiner

EMERGENCY ENERGY SUPPLY DEVICE FOR A HYBRID VEHICLE

FIELD OF THE INVENTION

The present invention relates to the field of the energy supply in hybrid vehicles.

BACKGROUND INFORMATION

Today's hybrid vehicles are usually equipped with a combustion drive and an electric drive, which, as shown in FIG. 4, is supplied with a voltage of 300 V for example by a high-voltage battery 401. High-voltage battery 401 is connected via a switch system 403 to an inverter 405, which generates a three-phase alternating voltage for an electric motor 407. Switch module 403 is switched in for example by a main protector 409 prior to starting electric motor 407. Main protector 409 is coupled for example mechanically with the aid of a mechanical coupling 411 to switch module 403 and draws the energy for actuating the latter from a low-voltage battery 413 having a 12 V direct voltage. Furthermore, control terminals 415 are provided, which are connected for example to a vehicle start button such that a starting process of the vehicle also initiates the closing of switch module 403.

If low-voltage battery 413 is discharged, however, then switch module 403 cannot be closed such that high-voltage battery 401 cannot be connected to inverter 405 and the electric motor consequently cannot be started. Moreover, in spite of the existing high-voltage battery 401, the vehicle electrical system supply of 12 V direct voltage is not ensured in the event of a failure of low-voltage battery 413 such that in addition to the electric motor other vehicle systems also cannot be supplied with electrical energy.

PCT International Published Patent Application No. WO 2007/115919 describes a hybrid drive, a vehicle electrical system battery being used to start an electric motor when the high-voltage battery is discharged. If the vehicle electrical system battery is discharged as well, then the starting procedure is performed with the aid of a jumper cable and a donor battery.

SUMMARY

Example embodiments of the present invention provide an efficient emergency energy supply for hybrid vehicles in particular when the low-voltage battery is discharged.

According to example embodiments of the present invention, an efficient emergency energy supply for hybrid vehicles includes another energy store, which may be charged by a high-voltage battery and/or by a low-voltage battery, for example a vehicle electrical system battery of the hybrid vehicle, and which provides the emergency energy supply when needed.

Example embodiments of the present invention provide an emergency energy supply device for a hybrid vehicle, which has a high-voltage battery for driving an electric drive and a low-voltage battery. The emergency energy supply device includes an energy store, which is electrically connectible to the high-voltage battery and/or to the low-voltage battery and is arranged to provide the emergency energy supply. The energy store is preferably supplied with electrical energy by the high-voltage battery and/or the low-voltage battery and is thereby charged.

The energy store may include a capacitor.

The energy store may be electrically connectible to the high-voltage battery via a voltage converter, for example a voltage divider or a transformer.

The energy store may be switchable in parallel to the low-voltage battery and connectible to the latter.

The high-voltage battery may be connectible to the electric drive via at least one switch, the energy store being arranged to provide electrical energy for closing the at least one switch in particular in the event of a failure of the low-voltage battery.

The emergency energy supply device may be arranged to couple the energy store electrically to the high-voltage battery and/or to the low-voltage battery in response to a control signal.

The emergency energy supply device may include a voltage converter, in particular a voltage divider or a transformer, a first diode, the cathode of which is connected to a terminal of the energy store and the anode of which is electrically connectible to the low-voltage battery, a second diode, the cathode of which is connected to the terminal of the energy store and the anode of which is coupled to an output terminal of the voltage converter and a controllable switch, which is electrically coupled to an input terminal of the voltage converter and is provided to connect or couple the voltage converter electrically to the high-voltage battery in a switchable manner.

The emergency energy supply device may include a controllable switching element having for example a relay or a contactor coil, the energy store being able to apply electrical energy to the switching element.

Example embodiments of the present invention provide a hybrid vehicle having an electric hybrid drive. The energy supply system includes a high-voltage battery for supplying the electric hybrid drive with electrical energy, a low-voltage battery, in particular a vehicle electrical system battery, and the emergency energy supply device, which is arranged to provide electrical energy for closing at least one switch to connect the high-voltage battery to the electric drive in the event of a failure of the low-voltage battery.

Example embodiments of the present invention provide a method for supplying emergency energy in a hybrid vehicle, which has a high-voltage battery for driving an electric drive and a low-voltage battery. The method includes the step of coupling the energy store to the high-voltage battery and/or to the low-voltage battery in order to charge the energy store, and the step of providing the emergency energy supply through the energy store in the event of a failure of the high-voltage battery and/or the low-voltage battery. Additional method steps derive from the structure or from the functionality of the emergency energy supply device.

Additional features and aspects of exemplary embodiments are explained in more detail with reference to the enclosed Figures.

DETAILED DESCRIPTION

Figure 1:
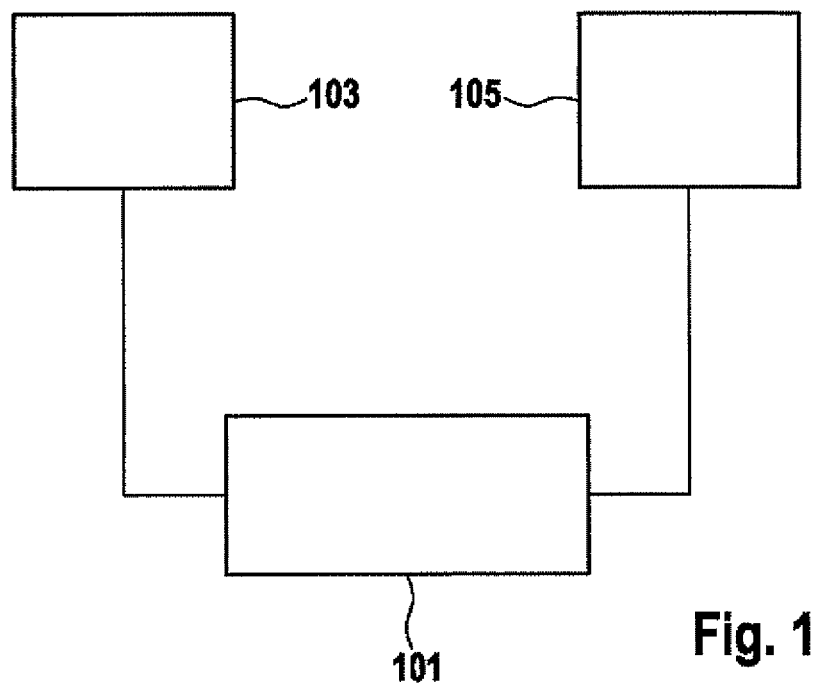
FIG. 1 illustrates an emergency energy supply device.

FIG. 1 shows an emergency energy supply device for a hybrid vehicle, which is connectible to a high-voltage battery 103 and/or to a low-voltage battery 105, for example of a vehicle electrical system battery having 12 V voltage. In operation, energy store 101 is charged with electrical energy by high-voltage battery 103 and/or by low-voltage battery 105 and provides this energy for example in the event of a failure of low-voltage battery 105.

High-voltage battery 103 and/or low-voltage battery 105 may be components of the emergency energy supply device. High-voltage battery 103 and/or low-voltage battery 105 may be components of the hybrid vehicle or elements of an electrical energy supply system.

The emergency energy supply device may be situated for example in a main protector or in a main protector control module such that with suitable additional circuitry of the main protector control module it is possible to start a hybrid drive system even when low-voltage battery 105 is discharged. In this case, the emergency energy supply device may also be used to switch the main protector contacts that connect the high-voltage battery to an inverter or an electric motor of the hybrid vehicle.

Energy store 101 may be implemented for example by a capacitance, for example by a double-layer capacitor, which is charged from low-voltage battery 105, which provides for example 12V, and/or from high-voltage battery 103, which provides for example 300 V. The emergency energy supply device may be arranged such that a potential separation between the high-voltage potential of high-voltage battery 103 and the 12 V potential of the vehicle electrical system is ensured.

Figure 2:
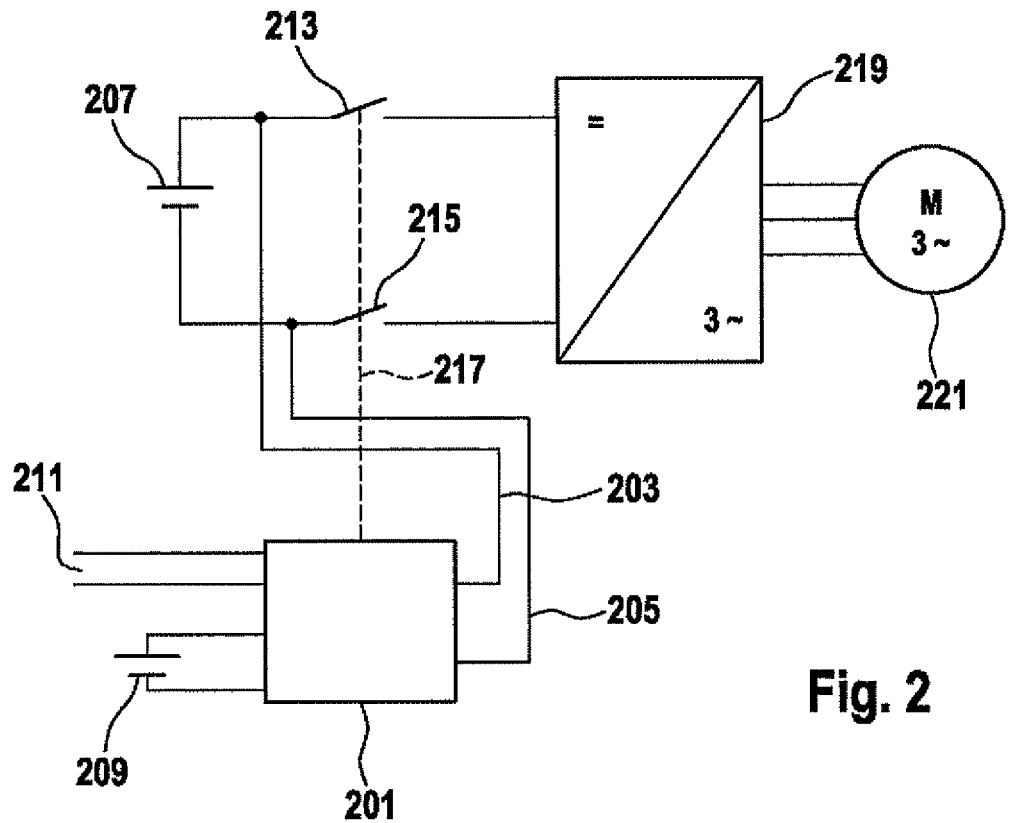
FIG. 2 illustrates an emergency energy supply device.

FIG. 2 illustrates the emergency energy supply according to an example embodiment of the present invention in an installation of the emergency energy supply device in a main protector 201. In contrast to the exemplary embodiment shown in FIG. 4, main protector 201 is equipped with contacts 203 and 205, which are respectively connected to terminals of a high-voltage battery 207 and in parallel to the latter. Furthermore, a low-voltage battery 209 is provided, which is connected to main protector 201 and provides for example 12 V vehicle electrical system voltage. Moreover, control contacts 211 are provided, which are connectible for example to a start button or to an ignition device of a hybrid vehicle such that when starting the latter the control contacts are bridged for example such that low-voltage battery 209 and/or the emergency energy supply device additionally situated in main protector 201 are able to supply the electrical energy required for closing switches 213 and 215 by using a mechanical contact 217. Switches 213 and 215 connect high-voltage battery 207 to an inverter 219, which for example converts the voltage provided by high-voltage battery 207 into a three-phase voltage and supplies the latter to an electric motor 221 of the hybrid vehicle.

As shown in FIG. 2, the main protector or main protector module 201 is additionally connected to high-voltage battery 207 and thus to the high-voltage side of the hybrid vehicle by the external circuitry for the purpose of further energy supply. In conjunction with the emergency energy supply device, main protector 201 may have a chargeable energy store, which may be charged for example by high-voltage battery 207 and which provides for example in the event of a failure of low-voltage battery 209, which is usually used to close switches 213 and 215, the emergency energy supply required for this purpose. Electric motor 221 may thus be started even in the event of a failure of low-voltage battery 209. Switches 213 and 215 are arranged for example as protective contacts, which are switched on for example when applying a control signal to control terminals 211 for example via an internal circuitry, whereupon electric motor 221 may be started. Furthermore, a DC/DC converter may be provided, which is connected for example to high-voltage battery 207 and supplies the low-voltage side of the hybrid vehicle with energy.

Figure 3:
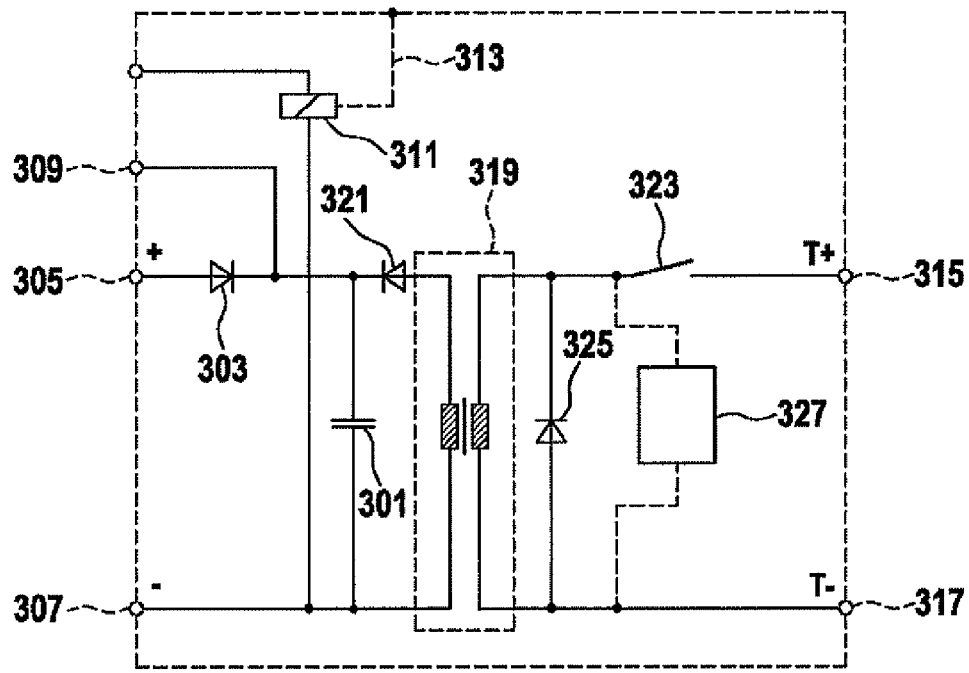
FIG. 3 illustrates an emergency energy supply device.

FIG. 3 shows an emergency energy supply device having an energy store 301, a first diode 303, which is connected in the direction of flow between a first terminal 305 of the emergency energy supply device and a terminal of energy store 301, for example of a capacitor. With its second terminal, energy store 301 is connected to a second terminal 307 of the emergency energy supply device. Terminals 305 and 307 are provided for example for an electrical connection to a low-voltage battery. The cathode of first diode 303 and the second terminal 307 of the emergency energy supply device are coupled with control terminals 309, a switching device 311, for example a relay, being situated between one of terminals 309 and second terminal 307 of the emergency energy supply device. Switching device 311 is provided to control for example the switches 213 and 215 shown in FIG. 2, via a mechanical connection 313 for example, and to close them.

The emergency energy supply device furthermore includes a third terminal 315 and a fourth terminal 317, which are connectible to a high-voltage battery for example. Furthermore, a voltage converter 319 is provided, which may be a transformer for example. A second diode 321 is disposed in the flow direction between an output terminal of voltage converter 319 and the terminal of energy store 301, which is connected to first diode 303.

Third terminal 315 is coupled for example by a switch 323 to an input terminal of voltage converter 319, it being possible for a third diode 325 to be disposed in the flow direction between fourth terminal 317 of the emergency energy supply device and a terminal of voltage converter 319 associated with third terminal 315.

If voltage converter 319 includes a transformer, then a direct voltage-alternating voltage converter 327 is optionally disposed, for example a chopper, which is provided to convert the direct voltage stemming from the high-voltage battery into alternating voltage, which is to be transmitted to energy store 301. Second diode 321 ensures that only direct voltage components are supplied to energy store 301.

In operation, first terminal 305 is connectible for example to a positive potential of the low-voltage battery and second terminal 307 is connectible to a negative potential of the low-voltage battery or to ground. Third terminal 315 is connectible for example to the positive terminal of the traction network supply (T+), for example to the positive terminal of the high-voltage battery.

Fourth terminal 317, on the other hand, is connectible to a negative potential of the traction energy supply (T−), for example to a negative potential of the high-voltage battery. Terminals 305 and 307 are preferably galvanically isolated from terminals 315 and 317.

The emergency energy supply device shown in FIG. 3 may be situated for example in the main protector module 201 shown in FIG. 2, terminals 309 corresponding for example to terminals 211 shown in FIG. 2. In normal operation, energy store 301 is charged for example from the vehicle electrical system or from the 12 V battery 209 shown in FIG. 2 and maintains the charge even in the event of a failure of low-voltage battery 209 because first diode 303 prevents a discharge of energy store 301 in the direction of the 12 V battery. In this manner it is possible to increase the operational reliability of the system. When the hybrid vehicle is at a standstill for a long period, however, energy store 301 may be discharged. The recharging process may be performed for example by using the high-voltage battery.

By the provision of voltage converter 319, second diode 321, switch 323 and third diode 325, the hybrid system is able to start independently of the 12 V vehicle electrical system and independently of a vehicle standstill period provided that the high-voltage battery, not shown in FIG. 3, has an appropriate state of charge. The charge state of the high-voltage battery is appropriate if it is possible to charge energy store 301 such that it is able to supply switching device 311 with electrical energy such that it is possible to close for example contacts 213 and 215 shown in FIG. 2. The circuitry of the emergency energy supply device shown in FIG. 3 thus ensures that a voltage in energy store 301 is sufficiently high to supply for example the switching device, which includes for example a contactor coil, with current when contacts 309 are bridged for example by a switch.

For example, switch 323, third diode 325 and voltage converter 319 form a step-down converter having a potential separation, switch 323 being a semiconductor switch for example, which may be operated in a cycling manner. Such a step-down converter may be activated for example only in a case of need, e.g. by a separate activation on the part of a driver, such that high-voltage battery 207 shown in FIG. 2 for example is not stressed continually.

Figure 4:
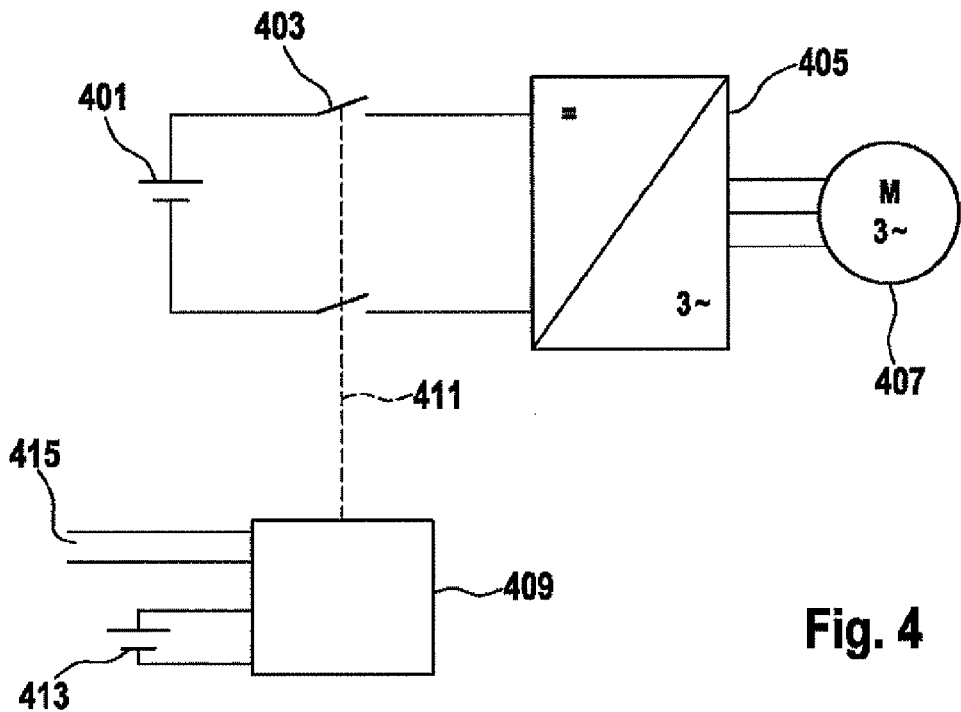
FIG. 4 illustrates an electrical energy supply in a hybrid vehicle.

The emergency energy supply device shown in FIG. 3 may also be situated in the main protector 409 represented in FIG. 4. In this case, the additional circuitry of the high-voltage side including voltage converter 319, second diode 321 and the additional elements of the high-voltage side may be omitted because energy store 301 may be charged by low-voltage battery 413.

What is claimed is:

1. An emergency energy supply device for providing an emergency energy supply for a hybrid vehicle, the hybrid vehicle including a high-voltage battery adapted to drive an electric drive, and a low-voltage battery, comprising:
   an energy store electrically connectible to at least one of (a) the high-voltage battery and (b) the low-voltage battery and configured to provide the emergency energy supply;
   a voltage converter;
   a first diode including a cathode connected to a terminal of the energy store and an anode electrically connectible to the low-voltage battery;
   a second diode including a cathode connected to the terminal of the energy store and an anode coupled to an output terminal of the voltage converter; and
   a controllable switch electrically coupled to an input terminal of the voltage converter and electrically connectible to the high-voltage battery.

2. The emergency energy supply device according to claim 1, wherein the energy store is configured to be chargeable by the high-voltage battery; and
   wherein the high-voltage battery is connectible to the electric drive via at least one switch and the energy store is configured to provide electrical energy to close the at least one switch.

3. The emergency energy supply device according to claim 1, wherein the energy store includes a capacitor.

4. The emergency energy supply device according to claim 1, wherein the energy store is electrically connectible to the high-voltage battery via a at least one of (a) a voltage converter, (b) a voltage divider, and (c) a transformer.

5. The emergency energy supply device according to claim 1, wherein the energy store is switchable in parallel to the low-voltage battery.

6. The emergency energy supply device according to claim 1, wherein the energy store is configured to provide electrical energy to close the at least one switch in the event of a failure of the low-voltage battery.

7. The emergency energy supply device according to claim 1, wherein the energy store is electrically coupleable to at least one of (a) the high-voltage battery and (b) the low-voltage battery in response to a control signal.

8. The emergency energy supply device according to claim 1, wherein the voltage converter includes at least one of (a) a voltage divider and (b) a transformer.

9. The emergency energy supply device according to claim 1, further comprising a controllable switching element suppliable with electrical energy by the energy store.

10. The emergency energy supply device according to claim 9, wherein the controllable switching element includes a relay.

11. An energy supply system for a hybrid vehicle having an electric hybrid drive, comprising:
    a high-voltage battery adapted to supply the electric hybrid drive with electrical energy;
    a low-voltage battery; and
    an emergency energy supply device including an energy store electrically connectible to at least one of (a) the high-voltage battery and (b) the low-voltage battery, the emergency energy supply device further comprising:
       a voltage converter;
       a first diode including a cathode connected to a terminal of the energy store and an anode electrically connected to the low-voltage battery;
       a second diode including a cathode connected to the terminal of the energy store and an anode coupled to an output terminal of the voltage converter; and
       a controllable switch electrically coupled to an input terminal of the voltage converter and electrically connectible to the high-voltage battery;
    wherein the emergency energy supply device is configured to provide the emergency energy supply, the emergency energy supply device configured to supply electrical energy to close at least one switch to connect the high-voltage battery to the electric drive in the event of a failure of the low-voltage battery and to be chargeable by the high-voltage battery.

12. The energy supply system according to claim 11, wherein the low-voltage batter is arranged as a vehicle electrical system battery.

* * * * *